United States Patent
Schindler et al.

[15] 3,652,034
[45] Mar. 28, 1972

[54] MISSLE CONSTRUCTION

[72] Inventors: Werner Schindler, Ottobrunn; Karl Schaaff, Hohenschaftlarn; Erich Planitzer, Neubiberg, all of Germany

[73] Assignee: Messerschmitt-Bolkow-Blohm Gesellschaft mit beschrankter Haftung, Munich, Germany

[22] Filed: Sept. 17, 1969

[21] Appl. No.: 858,602

[30] Foreign Application Priority Data

Oct. 3, 1968 Germany ............P 18 00 766.6

[52] U.S. Cl. .......................244/3.1, 102/49.3, 244/3.12
[51] Int. Cl. ...........................................F41g 7/02
[58] Field of Search .............102/49.3, 3.1; 244/3.12, 3.24

[56] References Cited

UNITED STATES PATENTS

| | | | |
|---|---|---|---|
| 2,947,500 | 8/1960 | Dreyer et al. | 102/49.3 X |
| 2,979,285 | 4/1961 | Planitzer | 244/3.24 X |
| 3,069,975 | 12/1962 | Nauschütz et al. | 244/3.12 |
| 3,070,016 | 12/1962 | Nauschütz et al. | 244/3.24 |

*Primary Examiner*—Verlin R. Pendegrass
*Attorney*—McGlew and Toren

[57] ABSTRACT

A missile or flying body construction includes a payload cone which is detachably connected to a fuselage portion by a coupling member. The payload cone forms the forward part of the missile and a rocket engine designed as an independent structural unit is made so that it can be inserted into the fuselage portion and secured thereto by means of an encircling clamping ring. The forward end of the rocket engine portion is provided with a threaded bore to permit interengagement thereof with a coupling member which is also threaded to the payload cone. The rocket engine carries a laterally or downwardly extending thrust nozzle projection which advantageously fits into a longitudinally elongated slot of the trailing fuselage portion. The fuselage portion in the form of a sleeve carries aerodynamic control surfaces and it forms a housing for controls such as a gyroscope, battery, and wire coil.

2 Claims, 2 Drawing Figures

PATENTED MAR 28 1972 3,652,034

INVENTORS
Erich Planitzer
Werner Schindler
Karl Schaaff
By Matthew & Loren ATTORNEYS

MISSLE CONSTRUCTION

SUMMARY OF THE INVENTION

This invention relates in general to the construction of flying bodies and, in particular, to a new and useful missile having a forward payload cone portion which is detachably secured to a rocket engine and a surrounding fuselage trailing portion.

At the present time, it is known to transportation a missile with a payload cone comprising a practice head, a hollow charge head or a fragmentizing explosive and to connect this head with a missile fuselage by means of a quick closure. Such constructions are required because during ransportation of the missile the payload cone and the missile fuselage must be handled separately both for better accommodation in a container and also for reasons of safety. A rocket engine includes many independent portions of distinct nature, for example, a rocket engine for propulsion, a missile fuselage, aerodynamically active control surfaces, and control and regulating components which must be lodged in the fuselage such as gyroscopes, electronic equipment, current supply means, etc. Therefore, it is usually necessary for reasons of safety to separate the manufacturing processes involving pure mechanical elements and electronic elements from those involving the manufacture of explosive powders, and flare compositions. In fact, the assemblies of various elements which are produced in different plants and separately balanced and tested as to their operation, must be mounted on a so-called main frame resistant to acceleration. Besides the possibility of faulty installation, damage to the individual assemblies is possible so that in addition to the balancing of the initially installed missile a second operational test of the assembly is necessary. Because of the fact that virtually absolute reliability must be demanded of such missiles, such operational tests must be carried out very accurately and therefore require very expensive special measuring equipment in addition to measuring lines which extend out of the fuselage.

A principal concern of the present invention is to provide a new construction of a missile which in addition to having a detachable connection of a payload cone with the fuselage also provides a simple interconnection of the rocket engine and fuselage so that the fuselage cell, engine and payload form independent units which may be tested separately. The assembly of such units can be effected without additional controls and operational tests and without special aids at any desired place.

In accordance with the invention, the rocket engine is designed as an independent unit which is insertable into the fuselage portion from the forward end as seen in the flying direction. The forward end of the rocket engine unit carries connections or coupling elements for a coupling member which is also connected to the payload cone and to the fuselage. In contrast to the known design of missile the rocket engine between the payload cone and the fuselage sub-assembly receiving the control and regulating components is designed as a supporting component, that is, as a so-called main frame. One end of the rocket engine is connected with the payload cone by way of a coupling piece while the other end is inserted into a fuselage front portion. Since the payload cone, the rocket engine unit and the fuselage form complete independent units, the final installation of the missile is reduced to the manual mechanical interconnection of these three independent units.

The connection of the rocket engine with the fuselage portion may be simply and safely effected if according to a preferred form of the invention the fuselage portion is formed as a cylindrical sleeve housing which receives housing control and regulating components such as gyroscopes, electronic equipment, etc., in a compartment adjacent its trailing end and is connectable at its forward end with the rocket engine. For this purpose, the forward end is opened and provided with a longitudinally extending slot which accommodates a laterally projecting nozzle formed on the rocket engine for the discharge of the thrust gases. The slot serves for the easy introduction of the rocket engine into the fuselage portion as well as for the setting of the correct interrelationship of these two parts in the assembly. It is of course, possible to form the rocket engine in a manner other than with a laterally extending or projecting thrust nozzle in which case a slot in the fuselage would not be employed. The thrust nozzle, for example, may be located in the forward end of the rocket adjacent the payload cone.

In accordance with another feature of the invention the payload cone is attached to the rocket engine in a simple manner by the interconnection of a threaded coupling member, a collar surrounds the fuselage casing and forms an abutment for a clip which is adapted to surround the fuselage and hold the fuselage against the rocket engine positioned within the forward end thereof. The clip, in turn, forms an exterior support handle for manually lifting and moving the missile. After the rocket engine is inserted into the fuselage portion, both units are clamped together in a simple manner by tightening the clip. At the forward end, the rocket engine is threaded to the coupling member which, at its forward end, is threaded to the payload cone.

In U.S. Pat. No. 3,013,494, a missile construction is indicated having a rocket engine arranged between a payload and the control and regulating components. In this construction, however, the rocket engine is not insertable into the fuselage portion but simply presents at its end faces flanges to which the units are permanently secured. In addition, a gas duct of the cruising engine concentrically traverses the fuselage portion receiving the control and regulating components. In addition, the aerodynamically active surfaces are fastened both on a fuselage portion and on the periphery of the rocket engine. With the invention, however, the production of the individual sub-assemblies and their installation and operational testing is vastly simplified from the known construction.

Accordingly, it is an object of the invention to provide an improved missile having a payload cone detachable connected by a coupling member with a fuselage portion which carries a rocket engine and aerodynamically active surfaces, and wherein the rocket engine is designed as an independent structural unit which is insertable into the fuselage portion from the forward end and it is secured at its forward end to the payload cone through the coupling member.

A further object of the invention is to provide a flying body construction which includes a rocket engine which is detachably coupled to a forward aerodynamically formed payload portion and which includes a laterally extending thrust nozzle which is insertable into a longitudinal slot at the forward end of a fuselage sleeve having aerodynamic control surfaces, and wherein the fuselage is clamped over the rocket engine by means of a clamping ring having a projection forming a lifting handle.

A further object of the invention is to provide a flying body which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive manner in which there is illustrated and described a preferred embodiment of the invention.

DETAILED DESCRIPTION OF THE PREFERRED EMBODIMENT

Figures 1, 2:
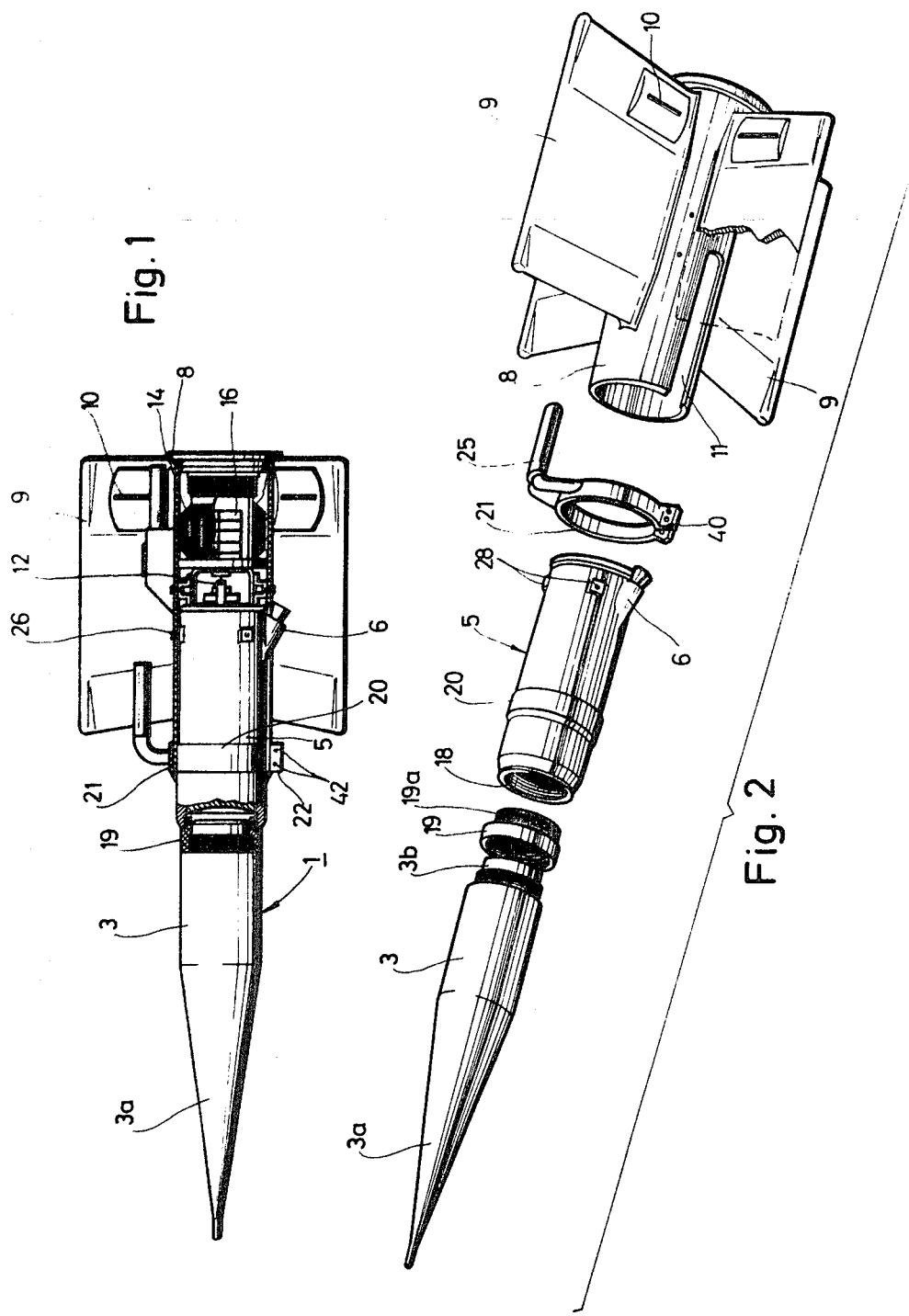
FIG. 1 is a partial side elevational and partial axial sectional view of a missile constructed in accordance with the invention.
FIG. 2 is an exploded perspective view of the missile indicated in FIG. 1.

Referring to the drawings in particular, the invention embodied therein comprises a flying body or missile generally designated 1 which includes a payload cone 3 having a forward aerodynamically shaped portion or cone 3a and a rear threaded cylindrical portion 3b. In accordance with the invention a rocket engine generally designated 5 is formed with a hollow threaded portion 18 which is threaded onto a cylindrical projection 19a of an intermediate collar or coupling 19, which in turn is interiorly threaded and interengaged with the cylindrical portion 3a of the cone 3.

The rocket engine 5 is a combined takeoff and cruising solid fuel engine with a single offset or laterally extending thrust nozzle 6. The thrust nozzle 6 is accommodated within a longitudinally extending slot formed at the forward end of a fuselage portion or fuselage sleeve 8. On the exterior circumference of the fuselage portion 8, there are aerodynamically active surfaces or guide fins 9 and anti-static discs 10 extending along the exterior thereof. The width of the slot 11 is such that it can span the offset thrust nozzle 6 of the rocket engine 5 when the latter is inserted into the fuselage portion 8 from the front end as seen in the flying direction.

The trailing end of the fuselage portion 8 accommodates all other structural parts of the missile, for example, in particular, the control and regulating components of which a gyroscope 12 and a wire coil 14 and a battery 16 are visible in FIG. 1. The wire coil 14 provides means for transmitting guiding signals between a guiding station and missile and it extends outwardly from the end of the missile to the guiding station and unwinds during the flight of the missile. The battery 16 which is necessary for the current supply is concentrically arranged in respect to the coil 14.

The coupling part 19 and the threaded part 18 of the thrust engine 5 is similar to that indicated and described in detail in German Pat. No. 1,086,153. The exterior surface of the rocket engine 5 is provided with an annular projection or collar 20 which serves as an abutment for a clip 21 with which the fuselage portion 8 and the rocket engine 5 are clamped together in the assembled state. The clip 21 includes flanges 40 at each end which are held together by bolt means 42. The rocket engine 5 also carries thread uptakes or lugs 28 at its trailing end which receives screws 26 which extend through the fuselage 8 from the exterior and are advantageously manually actuatable knurled screws. The clip 21 carries tongues 22 which are clamped together by suitable bolt elements in the assembled state and the exterior of the clip is formed into a handle 25 by means of which the mounted missile can be carried.

Thus the payload cone 3, the rocket engine 5 and the fuselage portion 8 which are mutually separated units form a complete assembly with the use of the two coupling members, namely, the coupling member 19 for the connection of the rocket engine and the payload cone and the clip 21 for the connection of the rocket engine and the fuselage 8. This simple assembly which requires no aids can be carried out in any desired location and without having any installation inaccuracies or any likelihood of damage by assembly. Consequently, the units need to be balanced and tested for operation only once at the place of their production and they may be stored separately in relatively small packings.

What is claimed is:

1. A missile construction comprising a forward payload cone, a trailing tubular fuselage forming a housing for the missile operating parts and having an opening at its forward end for accommodating a rocket engine therein, a rocket engine located within said fuselage and secured thereto; threaded coupling means for coupling said rocket engine to said payload cone, and an encircling collar extending around the forward end of said fuselage and clamping it to said rocket engine, said coupling means for coupling said rocket engine to said payload cone comprises a a coupling member having a cylindrical portion with a thread, said rocket engine having a forward bore recess with a thread threadably engaged with the thread of said coupling member, and an annular clip engaged around said fuselage and over said rocket engine and clamped to said fuselage and securing said rocket engine therein.

2. A missile construction comprising a forward payload cone, a trailing tubular fuselage opening at its forward end for accommodating a rocket engine therein, a rocket engine located within said fuselage and secured thereto, and coupling means for coupling said rocket engine to said payload cone, said coupling means for coupling said rocket engine to said payload cone comprising a coupling member having a cylindrical portion with a thread, said rocket engine having a forward bore recess with a thread threadably engaged with the thread of said coupling member, an annular clip engaged around said fuselage and over said rocket engine and claimed to said fuselage and securing said rocket engine therein, said clip including spaced apart flanges, and bolt means for clamping said flanges together to hold said clip around said fuselage, said rocket engine having an annular collar portion projecting from the surface thereof and bearing against the interior of said fuselage, said clip being located over said fuselage overlying said collar.

* * * * *